(12) United States Patent
Morrow

(10) Patent No.: US 7,343,498 B2
(45) Date of Patent: Mar. 11, 2008

(54) EXPRESSCARD POWER SWITCH DEVICE WITH ENHANCED COMMUNICATIONS PATHS AND SECURITY FUNCTIONS

(75) Inventor: Neil Morrow, San Jose, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 413 days.

(21) Appl. No.: 11/009,308

(22) Filed: Dec. 10, 2004

(65) Prior Publication Data

US 2005/0154930 A1 Jul. 14, 2005

Related U.S. Application Data

(60) Provisional application No. 60/529,290, filed on Dec. 12, 2003.

(51) Int. Cl.
*G06F 1/00* (2006.01)
(52) U.S. Cl. .................... 713/300; 713/320; 713/324
(58) Field of Classification Search ............... 713/300, 713/320, 324
See application file for complete search history.

(56) References Cited

U.S. PATENT DOCUMENTS

2004/0088590 A1* 5/2004 Lee et al. .................. 713/300
2005/0114587 A1* 5/2005 Chou et al. ................ 711/103

OTHER PUBLICATIONS

International Search Report and Written Opinion from related PCT case (10 pgs).

Arciniega, Davis S. Using the TPS2231 ExpressCard Power Switch/Controller, Aug. 2004 (6 pgs).
Specification: "TPM Main Part 1 Design Principles", Specification Version 1.2, Revision 94, Mar. 29, 2006, TCG Published (178 pages).
Specification: "TPM Main Part 2 TPM Structures", Specification Version 1.2, Level 2 Revision 94, Mar. 29, 2006, TCG Published (192 pages).
Specification: "TPM Main Part 3 Commands", Specification Version 1.2, Level 2 Revision 94, Mar. 29, 2006, TCG Published (326 pages).
Specification: "PCI Express Base Specification", Revision 1.1, Mar. 28, 2005, PCI Express (508 pages).
Specification: "System Management Bus Specification", Smart Battery System Specifications, Revision 1.1, Dec. 11, 1998, Benchmarq Microelectronics, Inc., et al. (39 pages).
Specification: "TCG Specification Architecture Overview", Specification Revision 1.2, Apr. 28, 2004, TCG 2004 (54 pages).
Specification: "TCG Software Stack (TSS)", "Part 1: Commands and Structures", Specification Version 1.2, Level 1, Jan. 6, 2006, 2006 Trusted Computing Group, Inc. (742 pages).

(Continued)

*Primary Examiner*—Thomas Lee
*Assistant Examiner*—Malcolm D Cribbs
(74) *Attorney, Agent, or Firm*—Grossman, Tucker, Perreault & Pfleger, PLLC

(57) ABSTRACT

A method according to one embodiment includes receiving at least one ExpressCard module power management signal and controlling the passing of at least one ExpressCard power management signal to a host computer system, based on, at least in part, at least one signal indicative of a power state of the host computer system. Of course, many alternatives, variations, and modifications are possible without departing from this embodiment.

30 Claims, 8 Drawing Sheets

OTHER PUBLICATIONS

Specification: "Universal Serial Bus Specification", Revision 2.0, Apr. 27, 2000, Compaq, et al. (622 pages).

English translation of Taiwan Office Action from related Taiwan application (2 pgs).

* cited by examiner

EXPRESSCARD POWER SWITCH DEVICE WITH ENHANCED COMMUNICATIONS PATHS AND SECURITY FUNCTIONS

This application claims priority to U.S. Provisional Application Ser. No. 60/529,290 filed Dec. 12, 2003, the teachings of which are hereby incorporated by reference in its entirety.

FIELD OF INVENTION

This disclosure relates to the design and manufacturing of power switch circuits that interface to ExpressCard sockets.

BACKGROUND OF THE INVENTION

The PCMCIA organization has developed specifications and implementation guidelines for a new type of PC Card called an ExpressCard. ExpressCard™ is a trademark of PCMCIA organization. The ExpressCard has a new form factor and electrical interface, and does not support the PCMCIA 16-bit or 32-bit (CardBus) interfaces defined by previous PC Card Standards.

The ExpressCard technical details are specified by PCMCIA Proposal 279, soon to be published, and in draft version 1.00 review. The "NEWCARD_Draft_1.0-091003" (Sep. 10, 2003) Electromechanical Specification and the "Guidelines_Draft_0.95110703" Implementation Guidelines documents are used as a basis for ExpressCard technical details throughout this disclosure. These documents are referred to as the ExpressCard Specification and the ExpressCard Guidelines (or Guidelines), respectively, throughout this document.

In the ExpressCard Specification, a new exchangeable input/output card is defined, called an ExpressCard module. There are two form factors for the modules defined in Section 4 of the ExpressCard Specification: called the ExpressCard/34 module (characterized by its 34 mm width) and the ExpressCard/54 module (characterized by its 54 mm width). The ExpressCard modules interface to a computer system through a physical connector, which is subject to the requirements of Section 5 of the ExpressCard Specification.

The ExpressCard guidelines contemplate ExpressCard modules interfacing to both mobile PC and desktop PC computer systems. For desktop PC computer systems, the Guidelines provide details regarding three topologies: motherboard direct attachment, riser card, and a cabled topology. For the riser card topology, the Guidelines recommend the PCI Express slot riser architecture, and illustrate a USB cabled connection to the riser card to provide USB type ExpressCard support. For the cabled topology, the Guidelines provide an interface cable connector and signal recommendation that includes PCI Express, USB, and other ExpressCard signals.

Conventional ExpressCard Electrical Interface

There are significantly less signals defined for the ExpressCard connector than the popular 68-pin PCMCIA (CardBus) signals defined by the PC Card Standard v8.0. The ExpressCard signals consist of five groups, as described in Section 3.1 of the ExpressCard Specification: PCI Express, Universal Serial Bus (USB), System Management Bus (SMBus), System Auxiliary Signals, and Power Signals.

The power signals are defined to supply voltage to the ExpressCard module. The following power supplies are provided: primary +3.3V, secondary +1.5V, and auxiliary +3.3Vaux. The auxiliary +3.3Vaux supply is typically used for low-power states. Ground signals (GND) provide the voltage reference.

The PCI Express signals include an x1 data interface (PETp0, PETn0, PERp0, PERn0), a spread-spectrum reference clock (REFCLK+, REFCLK−), and a functional reset (PERST#) all compliant with the PCI Express Standard. These seven PCI Express signals are required by an ExpressCard host, and are required by ExpressCard modules that provide PCI Express connectivity.

The ExpressCard Guidelines provide trace routing suggestions regarding the PCI Express differential transmit/receive signal pairs, and illustrates that the PCI Express x1 data interface interfaces to the host system chip set. The Guidelines also suggest an intervening PCI Express switch in alternate implementations. The ExpressCard Guidelines provide trace routing suggestions regarding the PCI Express reference clock, and suggests a connection between the reference clock (a.k.a. REFCLK) generator and the ExpressCard socket.

The PCI Express PERST# signal is intended to be used as a hardware reset for PCI Express based ExpressCard modules, and indicates that power supplied to the +3.3V and +1.5V sources are stable. Section 3.2.4 of the ExpressCard Specification illustrates timing diagrams related to ExpressCard power switching and the corresponding functionality of PERST#. The Guidelines illustrate PERST# as a component of the ExpressCard power switch, and the ExpressCard Specifications and Guidelines teach that PERST# behavior is also dependent on an optional additional system reset signal (SYS_RST).

The PCI Express signals include USB 2.0 data interface (USBD+, USBD−). The two USB signals are required by an ExpressCard host, and are all required by ExpressCard modules that provide PCI Express connectivity. The ExpressCard Guidelines provide trace routing suggestions regarding the USB 2.0 signals, and illustrates that the USB 2.0 signals interfaces to the host system chip set. The Guidelines also suggest an intervening USB host controller or downstream hub in alternate implementations.

The SMBus signals include only SMBDATA and SMBCLK, both conventional names for the data and clock signals defined by the SMBus Specification (Version 1.1). There are no assignments to the ExpressCard module for SMBus optional signals such as SMBALERT# and SMBSUS#. The ExpressCard Specification defines this SMBus interface as optional for both host systems and the ExpressCard modules.

The System Auxiliary Signals include four signals: CPPE#, CPUSB#, CLKREQ#, and WAKE#. The CPPE# signal is used to detect the presence of ExpressCard modules with a PCI Express electrical interface, and the CPUSB# signal is used to detect the presence of ExpressCard modules with a USB electrical interface.

The CLKREQ# signal is used to indicate when REFCLK is needed for an ExpressCard module with a PCI Express electrical interface. The REFCLK management is done for purposes of improving electromagnetic EMI emissions, as well as potential power savings. The Guidelines describe two clock control methods used to disable the REFCLK when no card is present or if the card does not need the REFCLK (e.g. a USB-type ExpressCard module). One method is to directly connect the CLKREQ# signal to an output enable input of the clock generator device. A second method is to connect the ExpressCard CLKREQ# signal to a general purpose input that generates a priority interrupt for the CPU, and BIOS level code would enable/disable the clock through SMBus communication with the clock generator. The ExpressCard specification requires CLKREQ# is left unconnected on ExpressCard modules that don't implement PCI Express.

The WAKE# signal is used by ExpressCard modules with a PCI Express electrical interface, to request that the host platform return from a sleep/suspended state. The Guidelines suggest an architecture sharing WAKE# with other slots in the system. The Guidelines discuss a WAKE# signal implementation that generates a power management event via native system I/O interfaces, conventionally, by a general purpose input signal to an embedded controller or host chip set components, generically called the PM controller in the PCI Express Specification. The ExpressCard specification requires WAKE# is left unconnected on ExpressCard modules that don't implement PCI Express, and further require that USB-based applications use the in-band wakeup protocol defined in the USB 2.0 Specification.

Conventional ExpressCard Power Switches

The ExpressCard Specification and Guidelines define elements of a power switch device, and illustrate conceptual power switch device implementations to provide controlled power to an ExpressCard socket. Since no ExpressCard power switches are available on the market today, a conventional ExpressCard power switch is considered to be a combination of what is learned in the ExpressCard Specification and Guidelines combined with what is typically provided for similar types of exchangeable I/O card power switches on the market today, such as PCMCIA power switches.

There are five separate functional blocks described here for the conventional ExpressCard power switch: thermal sensor, debounce, switch and PERST# control, power switches and/or regulators, and output meter.

Depending upon the available power supplied to a conventional ExpressCard power switch, or other factors including power trace impedance and supply variance, a power switch versus voltage regulator or LDO (low-drop output) voltage regulator architecture decision is made. With either solution, the conventional ExpressCard power switch shall be capable of supplying +3.3V at 1300 mA maximum, +3.3Vaux at 275 mA maximum, and +1.5V at 650 mA maximum per the ExpressCard power supply limit specifications. These supplies shall meet the respective voltage ranges at the ExpressCard socket interface, after incurring losses from system board trace impedance, power supply input variance, and contact resistance (60 m$\Omega$ maximum after stress) in the connector as specified in Section 5.3 of the ExpressCard Specification.

The ExpressCard Guidelines provide discussion regarding the power switch parameter of on-resistance, and has provided recommended values for the ExpressCard power switches. The Guidelines recommend 70 m$\Omega$ for the +3.3V switch, 85 m$\Omega$ for the +1.5V switch, and 200 m$\Omega$ for the +3.3Vaux switch. There is discussion in the Guidelines regarding voltage regulators needed to provide one or more of the voltages supplying power to an ExpressCard module. It is conventional practice to substitute switches with integrated voltage regulators, or LDO's, where practical; although the Guidelines make no recommendations to this effect.

The Guidelines illustrate connections between the power switch device and the module detection signals, CPPE# and CPUSB#. The ExpressCard Specification and Guidelines do not provide recommendations regarding debouncing circuitry for these inputs, but such circuitry is conventional for signals such as these that interface to mechanical switches.

Thermal sensors are conventional components of power delivery semiconductor components, including power switches and power converters. Conventional PCMCIA switches, such as O$_2$Micro's OZ2206 and OZ2211, include thermal sensors. Typically a thermal sensor may disable a power switch when the chip temperature reaches a predetermined value.

Section 3.2 of the ExpressCard Specification provides several illustrations of power ramping for ExpressCard modules, including the PERST# behavior. Timing diagrams for power-up conditions, power-down conditions, and power state transitions are given in the ExpressCard Specification, each including illustration that the PERST# signal is de-asserted only when the power is applied and stable at the module interface. The Guidelines also suggest that PERST# may be asserted when a second system-level reset signal is asserted. Power switch and PERST# control circuitry in the ExpressCard power switch generally meet the requirements discussed here.

ExpressCard Software

By way of further background, it is noted that the ExpressCard Specification and Guidelines do not include new software requirements beyond conventional USB and PCI practice; however, a few recommendations are provided. The Guidelines suggest one method of REFCLK control by means of providing new BIOS level software code, which may operate on an embedded controller, to handle the CLKREQ# signal from an ExpressCard module with a PCI Express electrical interface. Similarly, the Guidelines suggest that the WAKE# signal is handled by a power management controller, which may also require new BIOS level software code.

The most significant software recommendation is made in the ExpressCard Specification to handle interdependency for ExpressCard modules that contain both USB and PCI-Express electrical interfaces. When an eject, or removal, request is made by the computer system user for one electrical interface (via system specific techniques), the other electrical interface may also need to be stopped before it is necessarily safe to eject the module. Ejecting a module without stopping the electrical interface may yield unpredictable results, such as a system lock-up.

A software technique is illustrated in the ExpressCard Specification to handle interdependency, relieving the user from responsibility of "stopping" both USB and PCI-Express interfaces. The technical involves statically programming interdependency information, such as the interdependent USB port number and PCI-Express port number, into system non-volatile ROM data storage, such as the BIOS. The software technique involves receiving information regarding a removal (i.e. eject) request of a USB or PCI-Express device, and comparing the request information with the information stored in non-volatile ROM. If a match is made, and a first interdependent USB or PCI-Express interface is being removed, then a request to remove the second interdependent interface is made on behalf of the user. Then, both interdependent interfaces are stopped, and the user may safely eject the ExpressCard module.

ExpressCard Security Applications

There are several security-related applications that ExpressCard modules can accomplish; for example, biometric fingerprint identification devices, conventional ISO7816-3 Smart Card interface devices, wireless security products such as ISO14443 RF Smart Card, also called RFID, interface devices, and others. These ExpressCard applications will connect to the host PC through USB, PCI Express, or SMBus, as these are the only conventional ExpressCard electrical interfaces.

Biometric fingerprint identification devices are gaining popularity in computer security, and generally provide a sensor, a matching algorithm, and storage for a fingerprint template. These fingerprint identification devices generally provide medium level processing capabilities (e.g. state-of-the-art 16-bit embedded controller), for operating the matching algorithm and generating random numbers, keys, etc. They also generally provide non-volatile storage for security key-pairs and template storage. The most common PC bus interface for fingerprint identification devices today is USB, although the sensor interface to the embedded CPU is typically an SPI electrical interface, a conventional peripheral device interface to Motorola embedded CPUs; also specified by the MultiMediaCard Association as a flash media device interface.

The SPI interface is also common for communicating data between RF analog modules, including antenna connections, to the digital controller portion of an RFID system. ISO7816-3 Smart Cards and RF, contact-less, Smart Card applications are gaining popularity in client-authentication applications, and other computer system security applications. By convention, and by enhancements such as that described in U.S. Pat. No. 6,470,284, Smart Card security applications typically interface to PC systems through modular PC Cards. It is thus anticipated that these applications will be popular ExpressCard modules.

The Trusted Computing Group (TCG) has defined another security device. This device is in a second generation, first implemented as a Trusted Platform Module (TPM) specified by the Trusted Computing Platform Alliance (TCPA). The TPM device is bound to a computer system, and is not specified to be modular; thus, an ExpressCard form factor is not a conventional method of providing TCG technology. Although this is not an ExpressCard application by definition, it has found acceptance in PC applications, and may become an essential component of computer system security in the next few years. The TPM devices generally provide medium level processing capabilities, for performing security cryptographic function, generating random numbers, keys, etc. They also generally provide non-volatile storage for security key-pairs, protected data storage, and security certificate data, and firmware. Conventional TPM devices, available from market leaders Atmel and Infineon, interface to the PC system through the LPC (low-pin count) PC bus interface.

BACKGROUND SUMMARY

The inventor notes here the inadequacies of handling WAKE# and CLKREQ# signals from an ExpressCard module. Although the ExpressCard Specification and Guidelines provide suggested connectivity for these signals, they rely on the specification that USB modules will properly configure these terminals to operate within predictable boundaries. The inventor is pressed to develop a computer system enabled with an ExpressCard slot that operates within predictable boundaries when non-compliant modules are inserted.

The inventor notes here the undesirable nature of writing additional BIOS level code to handle WAKE#, CLKREQ#, and other conventional ExpressCard module communications. BIOS level code is difficult to manage across several computer system vendors, and is prone to error with lack of specification, and generally not as upgradeable as a typical software component (e.g. peripheral device driver). The inventor is pressed to develop an approach to ExpressCard connectivity that does not require additional BIOS level code above and beyond that required for conventional PC systems.

The inventor notes here also the inadequacies of the ExpressCard Specification as it relates to SMBus interface. Two conventional, and optional, SMBus signals were not defined in the ExpressCard Specification: SMBALERT# and SMBSUS#. Although optional, many SMBus devices include these signals in their terminal map, and may not function properly without them. Further inadequacy is found in that SMBus is not conventionally a hot-plug capable interface, and more careful design is required for a computer system to operate within predictable boundaries. It is also noted here that typically system-critical devices reside on the SMBus interface.

The inventor notes here the need for a more expandable electrical interface specification, as the ExpressCard Specification limits high-bandwidth applications to use the USB and PCI Express interfaces. The latest PC Card Specification, including that technology invented in U.S. Pat. No. 6,470,284, provides an approach to interface with PC Card devices through a native electrical interface, following a special detection process. Although USB and PCI Express are functionally capable of providing many conventional applications, there may be an increased cost of the modules by limiting the electrical interfaces.

Given the preceding background, the present inventor was faced with the evolution from conventional PC Card systems to the ExpressCard systems. Several inadequacies in the conventional ExpressCard connectivity model are noted above by the inventor, and a need arises to improve upon the prior-art to provide computer systems equipped with ExpressCard module connectivity that operate within predictable boundaries, and provide more cost effective solutions by expanding the choices of electrical interfaces to the modules.

BRIEF DESCRIPTION OF THE INVENTION

In one embodiment, there is an ExpressCard power switch device with a PC host bus interface that provides a communications path between an associated ExpressCard switch software driver and the power switch device. The software driver further controls power management events associated with the ExpressCard WAKE# and CLKREQ# signals, connected to the enhanced ExpressCard power switch device. In this embodiment, the PC host bus interface is the SMBus interface, and the power switch device further comprises an SMBus isolation circuit, to provide electrical isolation between an SMBus connection to the ExpressCard module and the SMBus connection to the host computer system. The power switch device further provides a complete SMBus interface, including optional SMBus signals. Lastly, in this described embodiment, there is a second integrated controller that includes a communications path with the PC host SMBus interface. The second integrated controller is a PCI Express REFCLK generator, and includes a REFCLK connection to the ExpressCard module, and an internal signal connecting to the power switch and PERST# control logic to indicate the state of the generated REFCLK (e.g. clock is stable and within specification).

In another embodiment, there is an ExpressCard power switch device with a PC host bus interface that provides connectivity to a platform security device, as specified by the TCG industry group. In this embodiment, the PC host bus interface is the LPC bus. The power switch device further integrates a biometrics fingerprint reader controller. The controller in this embodiment provides detection circuitry, to detect an ExpressCard module with a fingerprint sensor, and a non-conventional connection is made between the integrated biometrics fingerprint reader controller and the ExpressCard module. The preferred connection is the SPI bus interface.

Other circuits, systems, and methods are also described.

BRIEF DESCRIPTION OF THE INVENTION

DETAILED DESCRIPTION OF THE INVENTION

Figure 1:
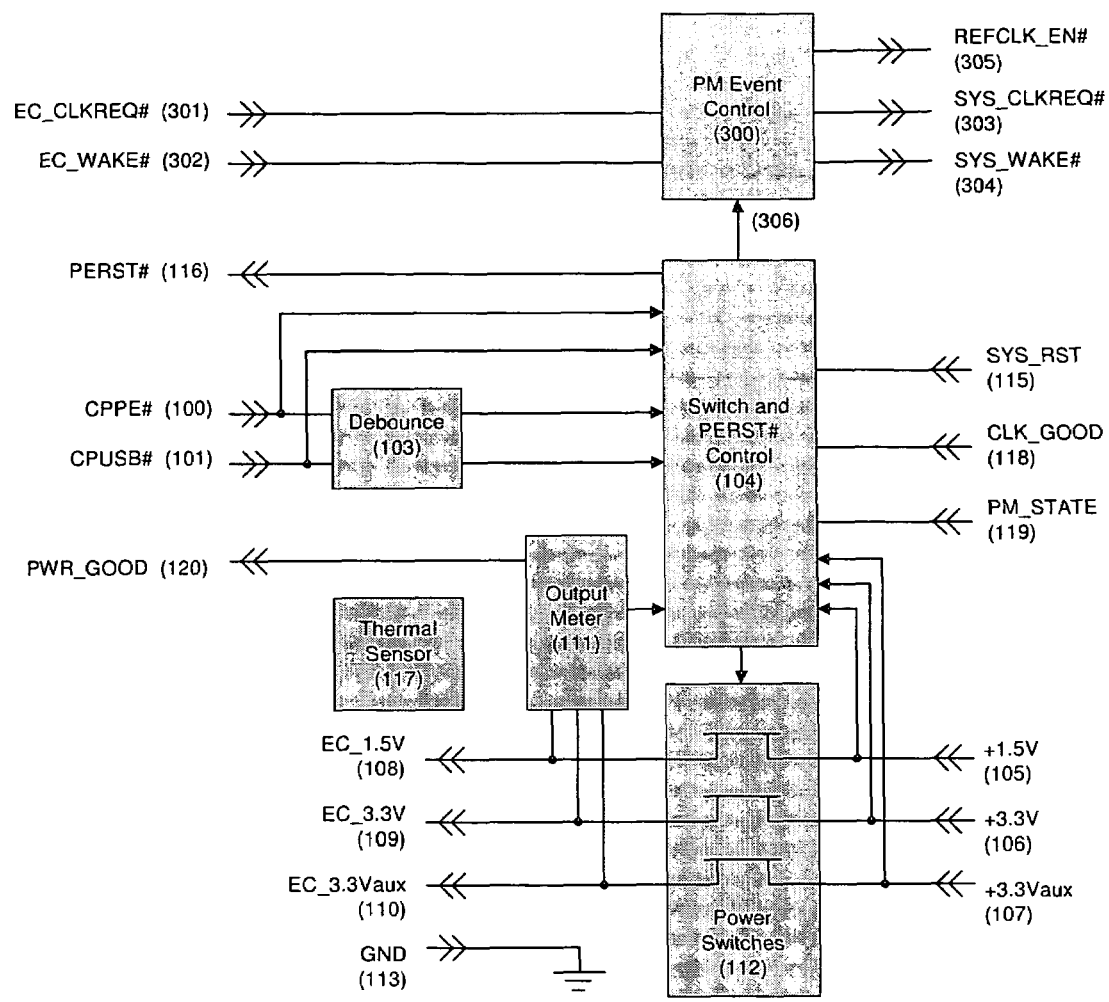
FIG. 1 illustrates a view of an enhanced ExpressCard power switch block diagram, including input terminals for ExpressCard WAKE# and CLKREQ# signals, and a circuit to control power management events associated with these new inputs.

FIG. 1 illustrates one exemplary block diagram of an enhanced ExpressCard power switch according to one embodiment. The ExpressCard power switch according to this embodiment may include power switches (112) which may meet the electrical specifications and the recommended on-resistance ranges provided in the aforementioned Guidelines. The power switches (112) may pass a first primary +1.5V power source (105), a second primary +3.3V power source (106), and a first auxiliary power source (107) to the ExpressCard module (not shown), typically via conventional field effect transistor (FET) techniques. When connected, the power switches (112) may provide the corresponding voltage level to the corresponding ExpressCard module power terminals, that is, the +1.5V supply signals (108), the +3.3V supply signals (109), and the +3.3Vaux supply signals (110). Conventionally, when the power switches are not connected, either a high impedance state may be presented to the ExpressCard module power terminals, or a reference ground (113) level may be presented.

The ExpressCard Specification may require certain behavior for out-of-tolerance conditions, that is, when the voltage supplied to the ExpressCard module does not meet the required ranges. Generally, the power switch may include an output meter (111) to measure current and/or voltage to determine when an out-of-tolerance condition is present, and then communicate this information to the switch and PERST# control logic (104).

The switch and PERST# control logic block (104) may utilize information to properly enable and disable the switches (112), and to properly assert and deassert the PERST# signal (116) to the ExpressCard module. System power state information may be used to meet the slot power rules given in the ExpressCard Specification, and may be obtained by measuring the voltages supplied to the power switch (105, 106, and 107), or by an input terminal (119), named PM_STATE in FIG. 1, providing system power state information. Per the ExpressCard Specifications, the PERST# behavior may be dependent upon the state of the PCI Express clock, REFCLK, and this information may be obtained by an input terminal, illustrated as CLK_GOOD (118) in FIG. 1. The ExpressCard Specification and Guidelines suggest PERST# is also dependent upon another, optional, system-level reset (115) related to PCI Express, and FIG. 1 illustrates such a terminal input as SYS_RST (115) interfacing to the switch and PERST# control logic block (104).

The switch and PERST# control logic block (104) may utilize information about the state of CPPE# (100) and CPUSB# (101) card present inputs, and FIG. 1 illustrates this connection. As is conventional for inputs that interface with mechanical switches, a debounce circuit (103) may be added to filter the direct inputs, and both filtered and unfiltered versions of the card present inputs may be provided to the switch and PERST# control logic block (104). Other conventional power switch features, such as a thermal sensor (117) to protect against high-temperature damage, and a signal (120) to the system indicating the output power is at a valid power level, PWR_GOOD, are illustrated in FIG. 1, and may be utilized in the present embodiment.

Alternatively or additionally, and although not shown in FIG. 1, this embodiment may also include an LDO or VR power converter in place of selected power switches 201, and/or a hybrid where at least one LDO/VR converter is implemented and at least one power switch (201) is implemented. Further alternatively or additionally, the system primary +3.3V power source (106) may be used to source power to the ExpressCard module +3.3V supply signals (109), and the +3.3Vaux supply signals (110). This configuration is practical for systems that do not require power management wake-up support. Further alternatively or additionally, debounce logic 103 may utilize a conventional clock input (for example, DEB_CLK).

In this exemplary embodiment of FIG. 1, an enhancement to a conventional ExpressCard power switch is provided that controls the passing of ExpressCard power management information to the host computer system, based on, at least in part, power management signals, conventional switch signals and conventional control signals. To accomplish this enhancement, for example, the power management signals (301, 302) CLKREQ# and/or WAKE# from the ExpressCard module (not shown), called EC_CLKREQ# (301) and EC_WAKE# (302) respectively, may be used as inputs. Information about these inputs (301, 302) may be passed to the host computer system (not shown) under control of the power management (PM) event control block (300). Control block 300 may include an internal communications path (306) providing conventional switch signals (from power switches 112) and the PERST# 116 control signal to the PM event control block (300), generally indicating when it is appropriate to pass information related to CLKREQ# and WAKE# to the host system.

There are several approaches of passing ExpressCard power management information to the host system, and one exemplary approach is illustrated in FIG. 1. The PM event controller in this example generally isolates the WAKE# and CLKREQ# signals from the host system, and passes the signals to the system via outputs (303, 304), controlled by the PM event control block (300). In one case, there may be two outputs, one for CLKREQ# information (303) and one for WAKE# information (304). In another case, there may be an additional output (305) for communicating any event that is appropriate to enable the PCI Express REFCLK to the ExpressCard module, which may or may not be logically combined with the CLKREQ# signal from the ExpressCard module.

Figure 2:
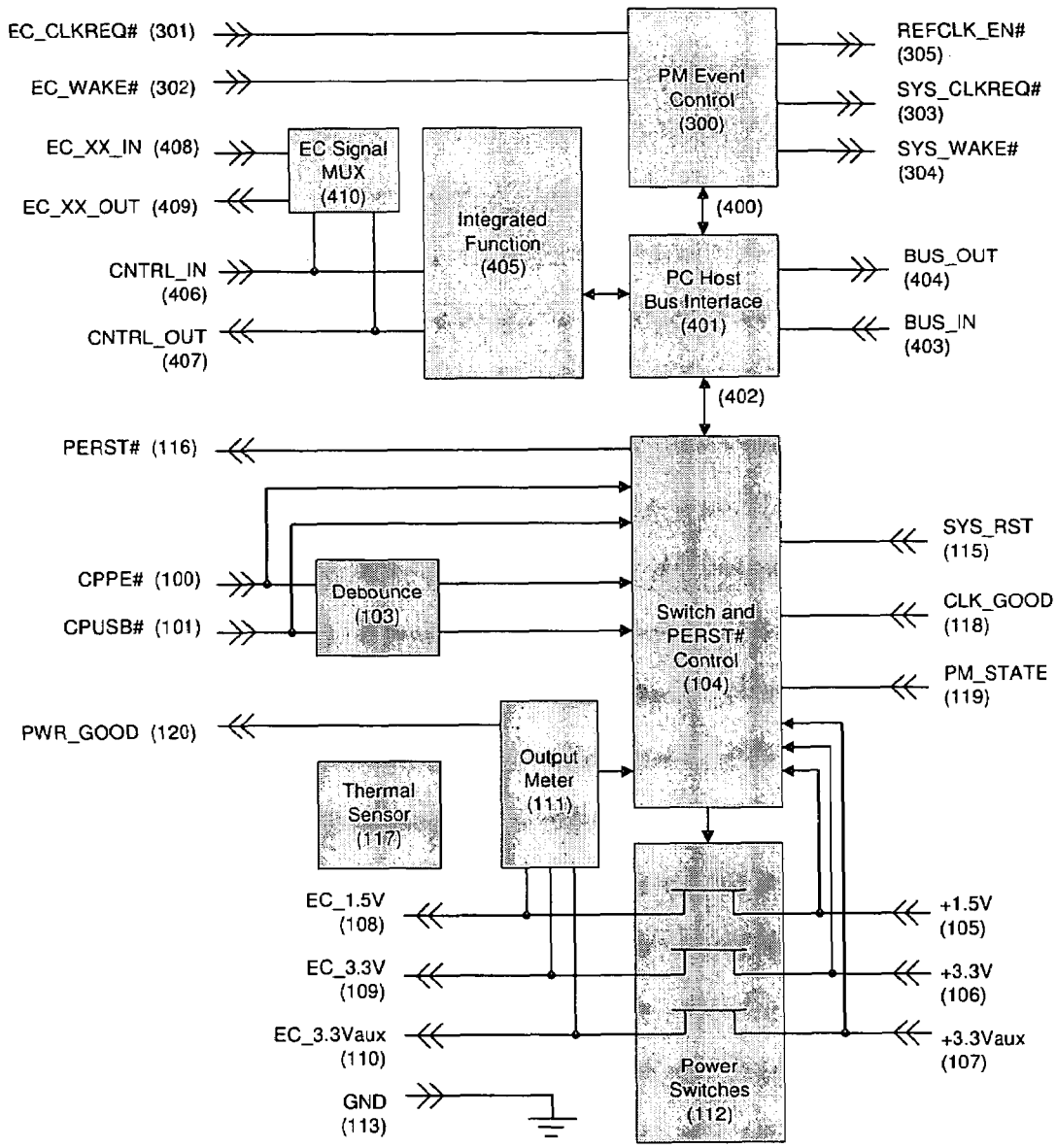
FIG. 2 illustrates a view of an enhanced ExpressCard power switch block diagram, including a PC host bus interface, an integrated controller associated with the PC host bus interface, and a multiplexing block that provides connectivity of the integrated controller to a non-conventional ExpressCard module.

FIG. 2 illustrates another approach of passing Express-Card power management information to the host system. In this case, an ExpressCard power switch is enhanced to include a PC host bus interface (401), which may be used via bus-specific output terminals (404) to communicate ExpressCard power management information obtained from the PM event control block through an internal connection (400).

The PC host bus interface 401 may generally include input terminals (403), as well as output terminals (404), and communicate with the computer system software using a communications protocol associated with the host bus interface (401). The interface may be used to provide information conventionally used by the switch and PERST# control logic block (104), such as system power state information. In this case, an internal connection (402) is made from the PC host bus interface to the switch and PERST# control logic block (104). The interface may also be used to obtain state information, conventionally available to the switch and PERST# control logic block (104); for example, thermal sensor status, card present status, and/or output meter readings.

FIG. 2 illustrates enhancements to further utilize the PC host bus interface, by adding an integrated function (405) to the ExpressCard power switch, which uses the PC host bus interface communications protocol. In a generic form illustrated in FIG. 2, the power switch with the integrated function may include input terminals (406) and/or output terminals (407) associated with the integrated function. Furthermore, the integrated function (405) may interface to a signal MUX (410), that multiplexes conventional Express-Card module signals with non-conventional signals associated with the integrated function. At the ExpressCard module electrical interface, an input terminal (408) may be capable of conventional and non-conventional signaling, and an output terminal (409) may be capable of conventional and non-conventional signaling.

Figure 3:
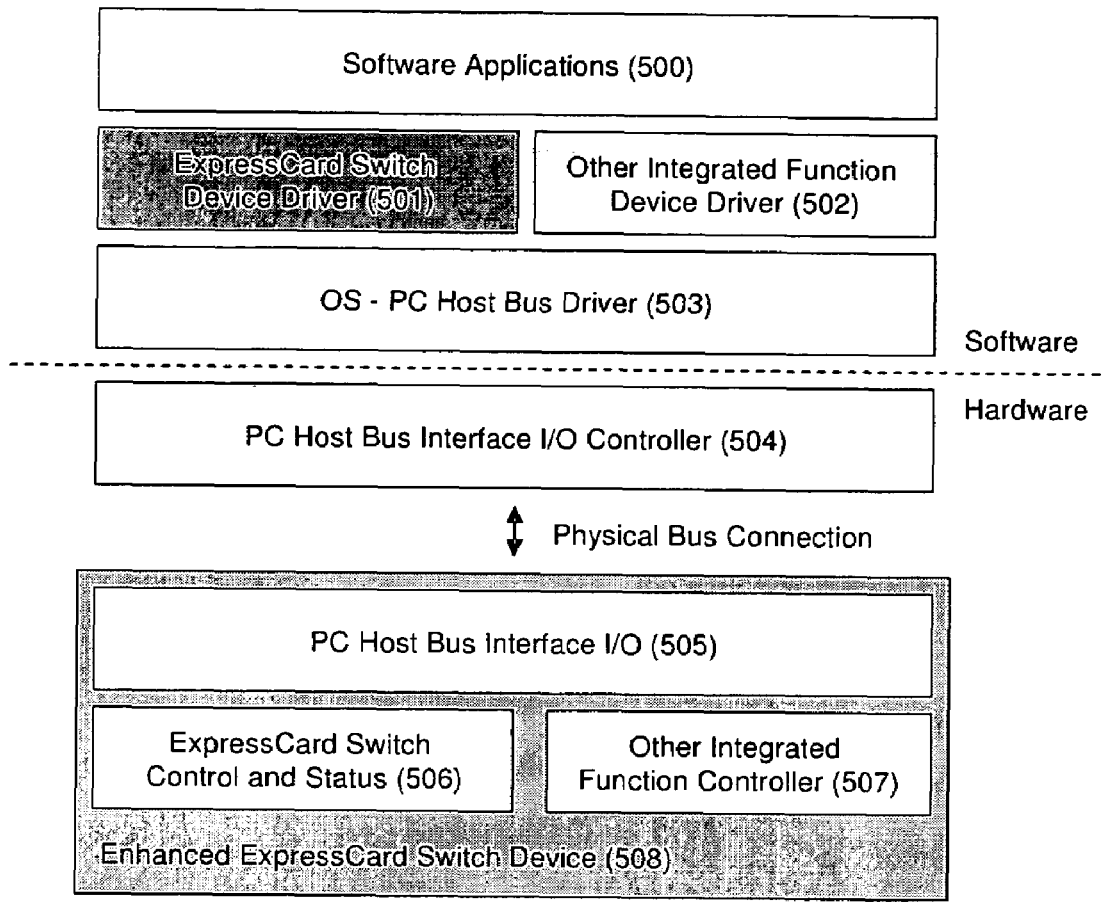
FIG. 3 illustrates a software and hardware stack illustrating the communications path between an enhanced ExpressCard power switch device and an associated software driver.

FIG. 3 illustrates an exemplary hardware and software stack, pertaining to the enhanced power switch device with a PC host bus interface (508). FIG. 3 illustrates one exemplary methodology for software applications (500) and other higher-level software programs to interface to the Express-Card switch device driver (501), a low-level software component, and optionally an integrated function device driver (502). The device drivers 501, 502 and/or 503 may communicate to the hardware layer through what may conventionally be called a bus driver (503). The PC host bus driver (503) may communicate directly with a hardware component called an I/O controller, or bus controller (504), which may control the I/O transfers over the physical bus connections. The enhanced power switch device (508) of this embodiment may include a PC host bus interface I/O connection (505), which may communicate to the Express-Card switch and PERST# control and status block (506), as well an optionally integrated function controller (507) associated with the bus interface (505).

The ExpressCard switch device driver (501) may provide a method for handling interdependency for ExpressCard modules that contain both USB and PCI-Express electrical interfaces. The software driver may provide a way to dynamically obtain interdependency information after an ExpressCard module is inserted, providing an approach to ExpressCard connectivity that does not require additional BIOS level code above and beyond that required for conventional PC systems. In one embodiment, the software driver makes a list of USB and PCI Express components present in the system when no ExpressCard module is inserted, and compares this list to another list made following the insertion of an ExpressCard module that provides both USB and PCI Express electrical interfaces. With such an algorithm, the software may, within reasonable error, dynamically obtain which USB and PCI Express ports are interdependent. Such a method for handling interdependency for ExpressCard modules that contain both USB and PCI-Express electrical interfaces may comprise:

a) dynamically receiving interdependency information after an ExpressCard module is inserted;

b) receiving information regarding an eject/removal request of a first USB or PCI-Express device;

c) comparing the information regarding an eject/removal request against the interdependency information; and d) communicating eject/removal request information regarding a second, interdependent, device.

Figure 4:
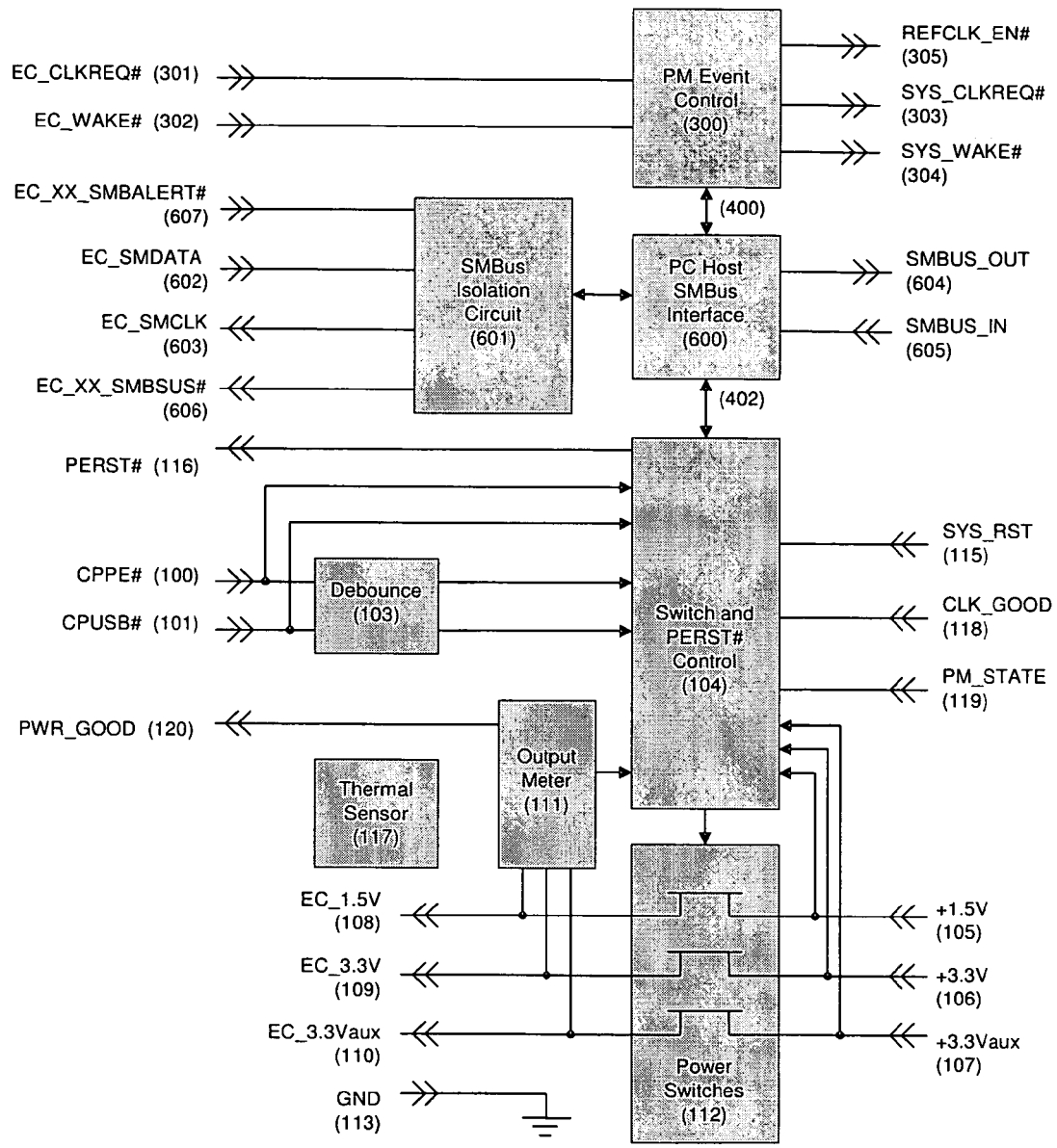
FIG. 4 illustrates the integrated SMBus isolation circuit, which is an element of a first preferred embodiment.

FIG. 4 illustrates another exemplary embodiment, which implements the PC host SMBus interface (600) as a communications path to host software (500, 501, 502, 503). The SMBus interface may include input signals (605), for example the SMBCLK clock input, and output signals (604), for example the SMBALERT# optional signal. This embodiment may also include an integrated SMBus isolation circuit (601) which may electrically isolate the ExpressCard module SMBus interface from the PC host SMBus interface.

The SMBus data signal (602) and the SMBus clock signal (603) connection to the ExpressCard module, that is, EC_SMBDATA and EC_SMBCLK respectively, may be isolated. Additionally, the optional SMBus signals specified in the SMBus Specification may be isolated, and may be multiplexed to conventional ExpressCard electrical signals, illustrated as EC_XX_SMBSUS# (606) and EC_XX_SMBALERT# (607) in FIG. 4. In one embodiment, the RSVD1 and RSVD2 signals for ExpressCard modules may be used for EC_XX_SMBSUS# (606) and EC_XX_SMBALERT# (607), respectively.

Figure 5:
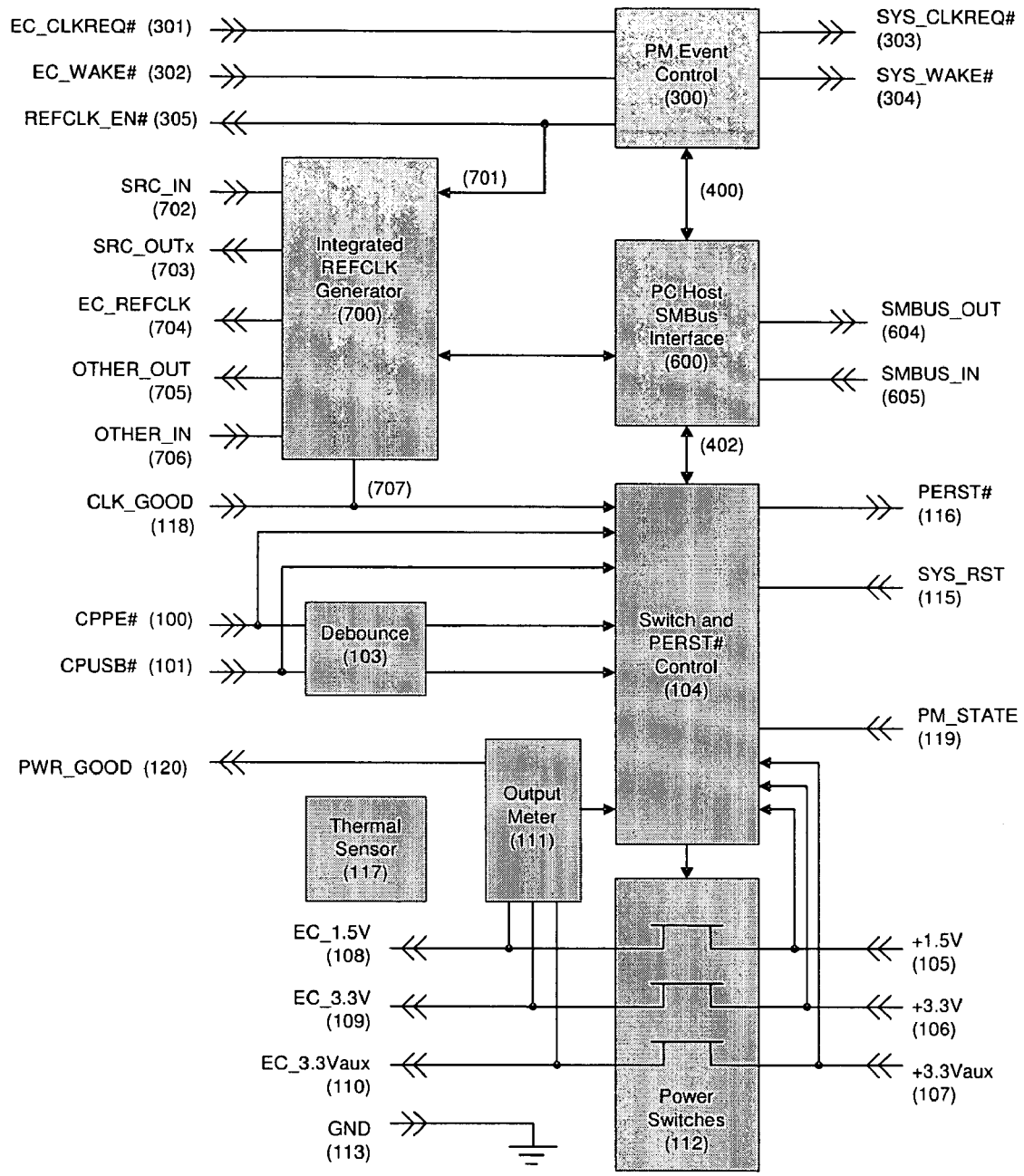
FIG. 5 illustrates the integrated REFCLK generator, which is an element of a first preferred embodiment.

FIG. 5 illustrates another exemplary embodiment of an enhanced ExpressCard power switch, which implements an integrated REFCLK generation function (700) associated with the SMBus host interface (600). The enhanced power switch of FIG. 5 may include a fan-out REFCLK generator, taking a source clock input (702) and fanning out REFCLK outputs (703) to the host computer system, including a REFCLK output (704) directly connected to the Express-Card module interface. The REFCLK generator (700) may have other outputs (705), for example, to communicate status of the quality of the clock outputs to the host system. The REFCLK generator (700) may have other inputs (706), for example, to control the phase-locked-loop parameters shaping the REFCLK outputs.

The enhance power switch of FIG. 5 may include an internal connection (707) to communicate state information about the ExpressCard module REFCLK (704) to the switch and PERST# control block (104). The integrated REFCLK generator (700) may also obtain control information form the PM event control block (300) through an internal connection (701).

Figure 6:
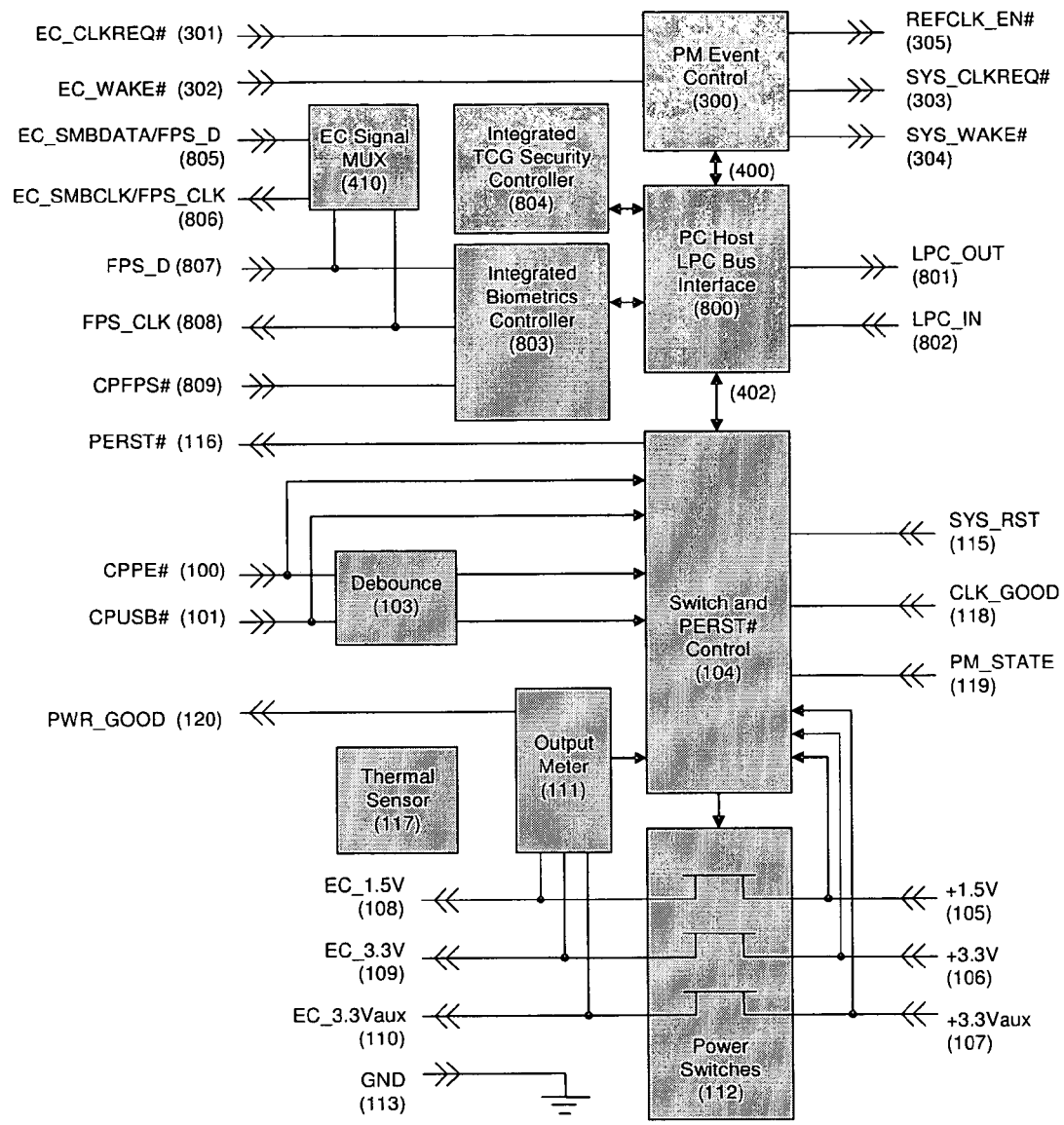
FIG. 6 illustrates the integrated TCG security controller, and an integrated biometrics controller that includes connectivity to a non-compliant ExpressCard module containing a sensor.

FIG. 6 illustrates another embodiment of an enhanced ExpressCard power switch, which implements the PC host LPC interface (800) as a communications path to host software, and may further integrate security functions. The LPC interface 800 may contain input signals (802), for example the LPC_CLK clock input and output signals (801), for example the LPC_AD0 signal, which is actually both and input and an output signal. In this embodiment, the enhanced power switch device may provide an integrated platform security device function (804), as may be specified by the TCG industry group.

The ExpressCard power switch in this embodiment further comprises an integrated biometrics controller (803), also communicating via the LPC host bus interface (800). In this embodiment, there may be two options for fingerprint sensor connectivity: on-system and ExpressCard. When the fingerprint sensor (not shown) is on the computer system (not shown), input and output terminals communicate to the sensor to obtain fingerprint data. At a minimum, a clock terminal (808) and a data terminal (807) may be used, and an SPI protocol may be used as a communications path to the sensor.

When the fingerprint sensor is on the ExpressCard module, the integrated controller 803 illustrated in FIG. 6 may first identify that this non-conventional ExpressCard module is inserted. One exemplary method to detect the non-conventional module is to sense an ExpressCard module terminal (809), such as the RSVD1. A pull-up resistor on the computer system may be used to create a high logic level on RSVD1 when a conventional ExpressCard module is inserted, or when the ExpressCard socket is empty. When a non-conventional module is inserted, the RSVD1 signal may be pulled to the ground reference by a lower-impedance resistor than the on-system pull-up. This method can be used to detect the non-conventional card, and still provide the EC_XX_SUS# output signal (606) described above in reference to FIG. 4, without any undesired bus contention.

When the non-conventional ExpressCard module containing a fingerprint sensor is identified by the method described above, connectivity is provided to the on-module clock terminal (806) and a data terminal (805), which are multiplexed with conventional ExpressCard signals; for example, SMBDATA and SMBCLK. This multiplexing scheme with the ExpressCard SMBus can be accomplished when the host SMBus interface is isolated from the ExpressCard SMBus interface, or when no host-side connectivity is provided for the ExpressCard SMBus protocol, defined as optional in the ExpressCard Specification. As with the on-system sensor connectivity scheme, an SPI protocol is the preferred communications path to the sensor.

Figure 7:
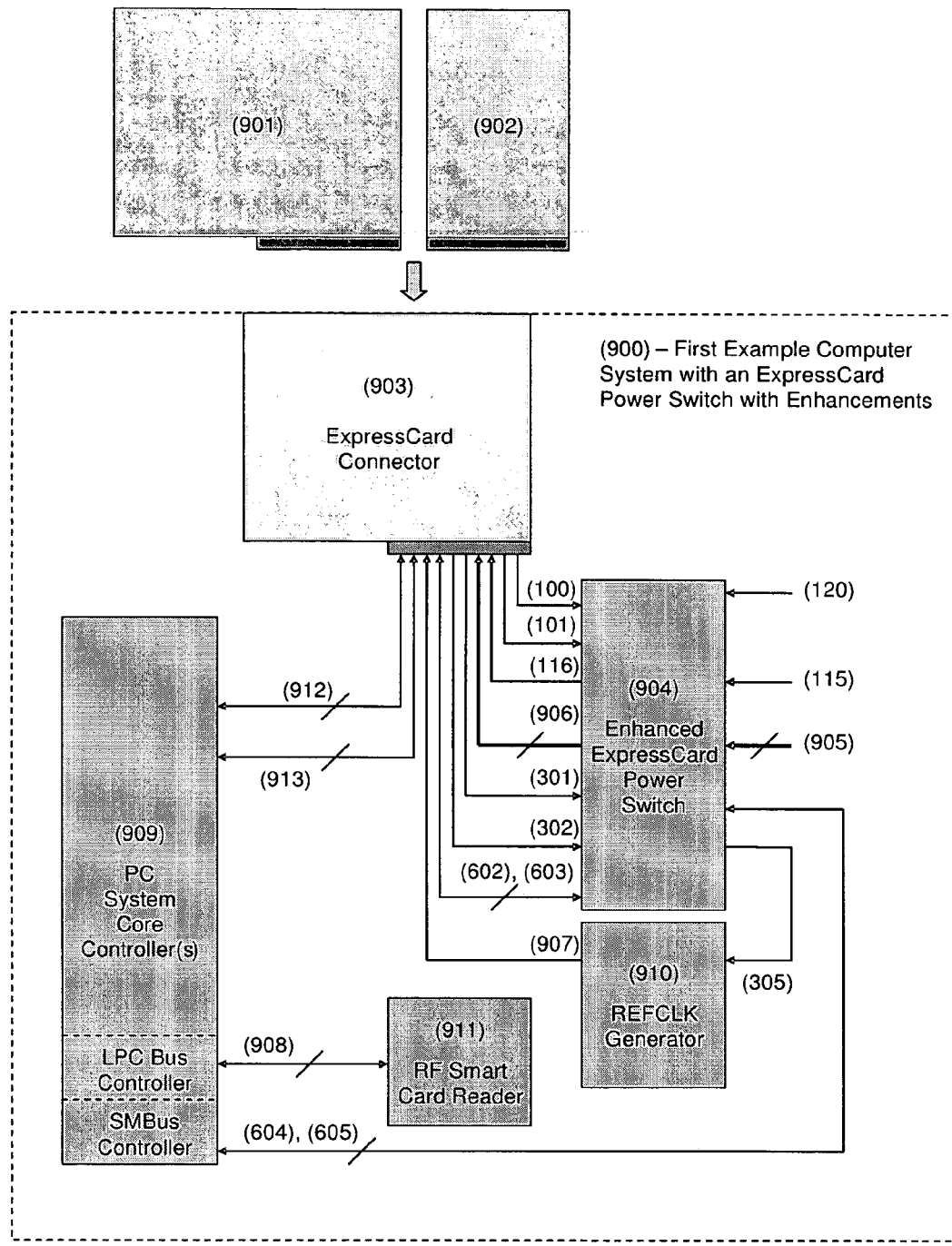
FIG. 7 illustrates a system view of one exemplary embodiment that implements an enhanced ExpressCard power switch.

FIG. 7 illustrates a first example of a computer system (900) with an alternate embodiment of the enhanced ExpressCard power switch. The computer system 900 may accept either an ExpressCard/34 module (902) or an ExpressCard/54 module (901) in the connector (903). The computer system implements an enhanced ExpressCard power switch (904) that may include many of the conventional signals illustrated in the previous embodiments, for example, including the three power sources (905), +1.5V, +3.3V, +3.3Vaux, which are switched to the ExpressCard module supply terminals (906).

The enhanced power switch device includes the SMBus interface illustrated in FIG. 4, which includes the PM event controller enhancement illustrated in FIG. 1. The PM event controller may assert a signal (305) that controls an on-system REFCLK generator (910), which provides the ExpressCard module REFCLK PCI Express clock (907).

The computer system illustration of FIG. 7 shows USB (912) and PCI Express (913) connectivity between the PC system core controller (909), or controllers (909), and the ExpressCard connector, as similarly illustrated in the ExpressCard Guidelines. The computer system of FIG. 7 may also include an LPC bus (908) controller, as a component of the PC system core controller (909), connecting to an RF Smart Card reader security function (911).

Figure 8:
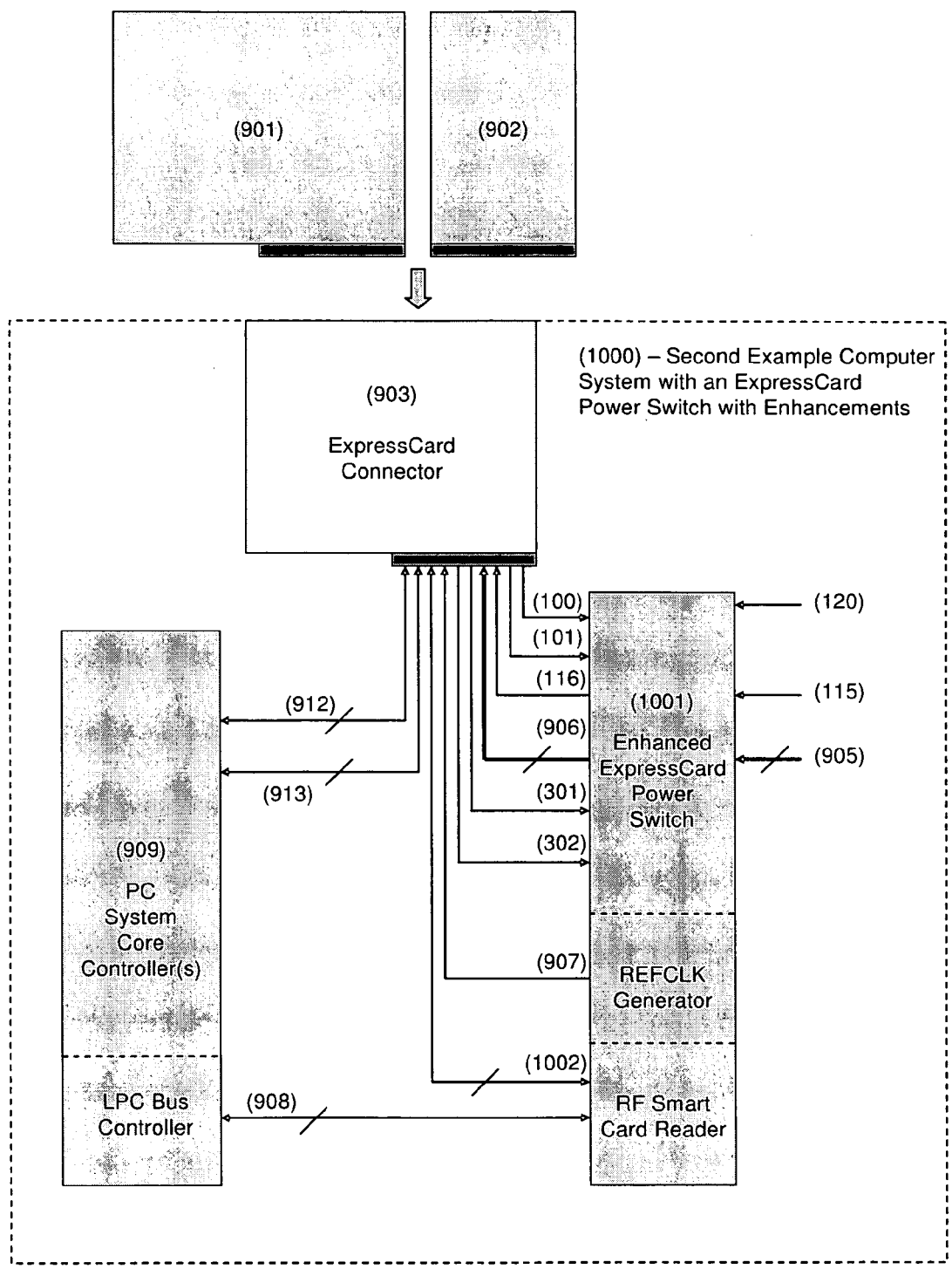
FIG. 8 illustrates a system view of another exemplary embodiment that implements an enhanced ExpressCard power switch.

FIG. 8 illustrates another exemplary computer system embodiment. In this embodiment, the REFCLK generation controller and RF security function into an enhanced ExpressCard power switch device (1001) may be integrated. FIG. 8 provides a system level view of the second computer system (1000) implementing the additional enhancements. The LPC bus provides the communications path for switch and PERST# control as well as the integrated security function. The additional signal path (1002) between the enhanced ExpressCard power switch device (1001) and the ExpressCard connector (903) illustrates a non-conventional electrical connection, which may be used to place the RF analog components, associated with the antenna circuitry, on an ExpressCard module.

Thus, in summary, at least one embodiment herein provides ExpressCard power switch integrated circuit (IC) that includes power management control circuitry capable of receiving at least one ExpressCard module power management signal. The power management control circuitry may be further capable of controlling the passing of at least one ExpressCard power management signal to a host computer system, based on, at least in part, at least one signal indicative of a power state of the host computer system.

Those skilled in the art may recognize numerous modifications, alterations or enhancements to one or more of the embodiments described herein. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An ExpressCard power switch integrated circuit (IC), comprising:

power management control circuitry capable of receiving at least one ExpressCard module power management signal; said power management control circuitry is further capable of controlling the passing of at least one ExpressCard power management signal to a host computer system, based on, at least in part, at least one signal indicative of a power state of said host computer system;

said power management control circuitry being further capable of passing at least one ExpressCard power management signal to a host computer system, based on, at least in part, at least one of CPPE# or CPUSB# card present information.

2. The IC of claim 1, wherein at least one ExpressCard power management signal passed to said host computer system is selected from the group consisting of an ExpressCard CLKREQ signal and an ExpressCard WAKE signal.

3. The IC of claim 1, wherein at least one ExpressCard power management signal passed to said host computer system comprises a PCI Express REFCLK enabled signal.

4. The IC of claim 1, further comprising PC host bus interface circuitry capable of communicating said at least one signal indicative of a power state of said host computer system to said power management control circuitry.

5. The IC of claim 4, wherein said PC host bus interface circuitry comprises SMBus interface circuitry.

6. The IC of claim 4, wherein said PC host bus interface circuitry comprises LPC interface circuitry.

7. The IC of claim 4, wherein said PC host bus interface circuitry comprises USB interface circuitry.

8. The IC of claim 4, wherein said PC host bus interface circuitry comprises PC host LPC interface circuitry.

9. The IC of claim 1, further comprising biometrics controller circuitry capable of communicating fingerprint information to said power management event controller circuitry, and wherein said power management control circuitry is further capable of passing at least one ExpressCard power management signal to a host computer system, based on, at least in part, said fingerprint information.

10. The IC of claim 1, further comprising TCG security controller circuitry capable of providing at least one security function that complies with a TCG specification, and wherein said power management control circuitry is further capable of passing at least one ExpressCard power management signal to said host computer system, based on, at least in part, said at least one security function.

11. A system, comprising:
a host computer system;
an ExpressCard module; and
an integrated circuit (IC) comprising power management control circuitry capable of receiving at least one ExpressCard module power management signal; said power management control circuitry is further capable of controlling the passing of at least one ExpressCard power management signal to said host computer system, based on, at least in part, at least one signal indicative of a power state of said host computer system; said power management control circuitry being further capable of passing at least one ExpressCard power management signal to a host computer system, based on, at least in part, at least one of CPPE# or CPUSB# card present information.

12. The system of claim 11, wherein at least one ExpressCard power management signal passed to said host computer system is selected from the group consisting of an ExpressCard CLKREQ signal and an ExpressCard WAKE signal.

13. The system of claim 11, wherein at least one ExpressCard power management signal passed to said host computer system comprises a PCI Express REFCLK enabled signal.

14. The system of claim 11, wherein said IC further comprising PC host bus interface circuitry capable of communicating said at least one signal indicative of a power state of said host computer system to said power management control circuitry.

15. The system of claim 14, wherein said PC host bus interface circuitry comprises SMBus interface circuitry.

16. The system of claim 14, wherein said PC host bus interface circuitry comprises LPC interface circuitry.

17. The system of claim 14, wherein said PC host bus interface circuitry comprises USB interface circuitry.

18. The system of claim 14, wherein said PC host bus interface circuitry comprises PC host LPC interface circuitry.

19. The system of claim 11, wherein said IC further comprising biometrics controller circuitry capable of communicating fingerprint information to said power management event controller circuitry, and wherein said power management control circuitry is further capable of passing at least one ExpressCard power management signal to a host computer system, based on, at least in part, said fingerprint information.

20. The system of claim 11, wherein said IC further comprising TCG security controller circuitry capable of providing at least one security function that complies with a TCG specification, and wherein said power management control circuitry is further capable of passing at least one ExpressCard power management signal to said host computer system, based on, at least in part, said at least one security function.

21. A method, comprising:
receiving at least one ExpressCard module power management signal;
controlling the passing of at least one ExpressCard power management signal to a host computer system, based on, at least in part, at least one signal indicative of a power state of said host computer system; and
passing at least one ExpressCard power management signal to a host computer system, based on, at least in part, at least one of CPPE# or CPUSB# card present information.

22. The method of claim 21, wherein at least one ExpressCard power management signal passed to said host computer system is selected from the group consisting of an ExpressCard CLKREQ signal and an ExpressCard WAKE signal.

23. The method of claim 21, wherein at least one ExpressCard power management signal passed to said host computer system comprises a PCI Express REFCLK enabled signal.

24. The method of claim 21, further comprising:
communicating said at least one signal indicative of a power state of said host computer system using PC host bus interface circuitry.

25. The method of claim 24, wherein said PC host bus interface circuitry comprises SMBus interface circuitry.

26. The method of claim 24, wherein said PC host bus interface circuitry comprises LPC interface circuitry.

27. The method of claim 24, wherein said PC host bus interface circuitry comprises USB interface circuitry.

28. The method of claim 24, wherein said PC host bus interface circuitry comprises PC host LPC interface circuitry.

29. The method of claim 21, further comprising:
communicating fingerprint information; and
passing at least one ExpressCard power management signal to said host computer system, based on, at least in part, said fingerprint information.

30. The method of claim 21, further comprising:
generating at least one security function that complies with a TCG specification; and
passing at least one ExpressCard power management signal to said host computer system, based on, at least in part, said at least one security function.

* * * * *